US012429157B2

(12) United States Patent
Im et al.

(10) Patent No.: US 12,429,157 B2
(45) Date of Patent: Sep. 30, 2025

(54) TWO-WAY TWIN-AXIAL CONNECTOR MODULE OF A RECEPTACLE FOR TRANSPORTING LIQUEFIED GAS AND LIQUEFIED GAS TRANSPORT SYSTEM INCLUDING THE SAME

(71) Applicant: H2CREO Corp., Dover, DE (US)

(72) Inventors: Jeong Hyun Im, Gangwon-do (KR); Hyung Jin Kim, Gyeonggi-do (KR); Jong H Baik, Titusville, FL (US)

(73) Assignee: H2CREO CORP., Dover, DE (US)

( * ) Notice: Subject to any disclaimer, the term of this patent is extended or adjusted under 35 U.S.C. 154(b) by 0 days.

(21) Appl. No.: 18/436,837

(22) Filed: Feb. 8, 2024

(65) Prior Publication Data

US 2024/0309980 A1    Sep. 19, 2024

Related U.S. Application Data

(60) Provisional application No. 63/452,779, filed on Mar. 17, 2023.

(51) Int. Cl.
*F16L 37/56* (2006.01)
*F16L 37/42* (2006.01)
(Continued)

(52) U.S. Cl.
CPC .............. *F16L 37/56* (2013.01); *F16L 37/42* (2013.01); *F16L 59/065* (2013.01);
(Continued)

(58) Field of Classification Search
CPC ..... F16L 37/56; F16L 37/0847; F16L 37/127; F16L 37/40; F16L 37/42; F16L 59/065;
(Continued)

(56) References Cited

U.S. PATENT DOCUMENTS 2,265,267 A * 12/1941 Cowles .................. F16L 37/42
                                                                       285/379
2,510,125 A *  6/1950 Meakin ................. F16L 37/127
                                                                       174/21 JS
(Continued)

FOREIGN PATENT DOCUMENTS

DE    102012103061 A1 *  9/2013  ............ B62B 27/34
FR         2556444 A1 *  6/1985
(Continued)

*Primary Examiner* — David Colon-Morales
(74) *Attorney, Agent, or Firm* — Moser Taboada

(57) ABSTRACT

A two-way twin-axial connector module of a receptacle for transporting liquefied gas is provided, including a male connector connected to an end of a transferring pipe incorporating a first supply line for supplying liquefied gas and a first return line for retrieving the vaporized gas, including a pair of male bayonets formed to protrude and surround protruding portions of the first supply line and the first return line, respectively, which are formed to protrude outward through the end of the transferring pipe, and a female connector incorporating a second supply line for supplying liquefied gas and a second return line for retrieving vaporized gas, to be connected to a supply source for supplying liquefied gas or a storage tank for storing liquefied gas, including a pair of female bayonets concavely formed and connecting with the second supply line and the second return line, respectively.

20 Claims, 7 Drawing Sheets

(51) Int. Cl.
*F16L 59/065* (2006.01)
*F16L 59/18* (2006.01)
*F17C 7/04* (2006.01)
*F16L 37/084* (2006.01)
*F16L 37/127* (2006.01)

(52) U.S. Cl.
CPC .............. *F16L 59/188* (2013.01); *F17C 7/04* (2013.01); *F16L 37/0847* (2013.01); *F16L 37/127* (2013.01); *F17C 2221/012* (2013.01)

(58) Field of Classification Search
CPC ............ F16L 59/188; F17C 2205/0367; F17C 2221/012; F17C 2223/0161; F17C 2223/033; F17C 2225/0161; F17C 2225/033; F17C 7/04; F17C 2205/037; F17C 2265/032; Y02E 60/32; Y02E 60/34

See application file for complete search history.

(56) References Cited

U.S. PATENT DOCUMENTS

| | | | | |
|---|---|---|---|---|
| 2,520,215 A * | 8/1950 | Kerr | ...................... | F16L 37/127 285/317 |
| 2,628,850 A * | 2/1953 | Donald | .................... | F16L 37/42 251/149.7 |
| 2,858,146 A * | 10/1958 | Bleyle, Jr. | ............... | F16L 37/40 251/96 |
| 3,583,667 A * | 6/1971 | Amneus, Jr. | .......... | F16L 37/252 285/376 |
| 3,667,246 A * | 6/1972 | St. Lorant | ............. | F17C 13/026 62/51.1 |
| 4,105,046 A * | 8/1978 | Sturgis | .................... | F16L 37/56 251/149.6 |
| 4,458,719 A * | 7/1984 | Strybel | ................. | F16L 37/127 251/149.6 |
| 4,474,592 A * | 10/1984 | Kundig | ................ | C01B 3/0089 423/649 |
| 4,753,268 A * | 6/1988 | Palau | ...................... | F16L 37/42 285/914 |
| 4,887,433 A * | 12/1989 | Locatelli | .................... | F17C 6/00 62/50.7 |
| 4,982,736 A * | 1/1991 | Schneider | ............... | F16L 37/56 607/104 |
| 5,243,821 A * | 9/1993 | Schuck | ..................... | F17C 7/04 62/50.1 |
| 5,261,638 A * | 11/1993 | Onishi | ...................... | F16L 37/42 137/614.04 |
| 5,301,723 A * | 4/1994 | Goode | ...................... | F17C 5/02 141/69 |
| 5,323,808 A * | 6/1994 | Shimizu | ............. | B60H 1/00585 137/614.04 |
| 5,464,042 A * | 11/1995 | Haunhorst | .......... | F24F 13/0209 137/614.04 |
| 5,762,119 A * | 6/1998 | Platz | ........................ | F17C 9/02 141/2 |
| 6,302,147 B1 * | 10/2001 | Rose | ...................... | F16L 37/56 137/614.04 |
| 6,877,778 B2 * | 4/2005 | Froment | ................ | F16L 37/113 285/361 |
| 7,052,047 B1 * | 5/2006 | Box | ...................... | F16L 59/184 62/50.7 |
| 7,299,823 B2 * | 11/2007 | Smith | ..................... | F16L 29/02 251/149.6 |
| 7,455,280 B2 * | 11/2008 | Parrish | ................ | F16L 37/0925 251/149.6 |
| 7,484,540 B2 * | 2/2009 | Pechtold | .................... | F17C 6/00 141/69 |
| 7,854,236 B2 * | 12/2010 | Jibb | ...................... | F16L 59/065 285/47 |
| 8,579,334 B2 * | 11/2013 | Schnallinger | ........... | F16L 21/03 285/364 |
| 8,695,357 B2 * | 4/2014 | Brook | ................ | F02M 21/0221 62/50.2 |
| 9,869,428 B2 * | 1/2018 | Drube | ..................... | F04B 15/08 |
| 10,473,246 B2 * | 11/2019 | Herrema | ................ | F16L 37/138 |
| 11,079,051 B2 * | 8/2021 | Kawai | ..................... | F16L 39/005 |
| 11,480,301 B2 * | 10/2022 | Beuneken | ................ | F17C 5/02 |
| 11,788,661 B2 * | 10/2023 | Hsieh | ...................... | F16L 37/42 285/316 |
| 11,821,557 B2 * | 11/2023 | Jordan | .................... | F16L 37/244 |
| 11,840,140 B2 * | 12/2023 | Kondo | ............ | B60K 15/03006 |
| 12,000,541 B2 * | 6/2024 | Bernhardt | ................ | F17C 6/00 |
| 12,006,204 B2 * | 6/2024 | Fairy | ....................... | B67D 7/80 |
| 12,123,540 B2 * | 10/2024 | Coleiro | ................ | F16L 59/065 |
| 12,158,242 B2 * | 12/2024 | Bernhardt | ............... | F17C 3/00 |
| 12,188,734 B2 * | 1/2025 | Chen | .................... | G06F 1/20 |
| 12,234,938 B2 * | 2/2025 | Zhang | ..................... | F16L 37/56 |
| 2011/0148097 A1 * | 6/2011 | Ping | ..................... | A61M 16/08 285/125.1 |
| 2015/0068246 A1 * | 3/2015 | Hakamade | ................ | F25J 1/001 62/607 |
| 2024/0117911 A1 * | 4/2024 | Coleiro | ................ | F16L 39/005 |
| 2024/0151358 A1 * | 5/2024 | Minas | ........................ | F17C 5/04 |
| 2024/0337439 A1 * | 10/2024 | Kariya | ..................... | F25J 1/001 |
| 2025/0003542 A1 * | 1/2025 | Coleiro | ................... | F16L 37/35 |

FOREIGN PATENT DOCUMENTS

| | | | | |
|---|---|---|---|---|
| FR | 2663714 A1 * | 12/1991 | | |
| KR | 10-0310819 | 2/2001 | | |
| KR | 102376273 B1 * | 3/2022 | | |
| KR | 102473949 B1 * | 12/2022 | | |
| KR | 102688520 B1 * | 7/2024 | | |
| WO | WO-2005124218 A1 * | 12/2005 | .............. | F16L 37/40 |
| WO | WO-2023219083 A1 * | 11/2023 | | |

* cited by examiner

DETAIL "A"

TWO-WAY TWIN-AXIAL CONNECTOR MODULE OF A RECEPTACLE FOR TRANSPORTING LIQUEFIED GAS AND LIQUEFIED GAS TRANSPORT SYSTEM INCLUDING THE SAME

CROSS-REFERENCE TO RELATED APPLICATIONS

The present application claims the benefit of and priority to U.S. Provisional Application Ser. No. 63/452,779, filed on Mar. 17, 2023, the entire contents of which is incorporated herein by reference.

BACKGROUND

1. Field of Invention

The present disclosure relates to a two-way twin-axial connector module of a receptacle for transporting liquefied gas and a liquefied gas transport system including the same, and more specifically, to a two-way twin-axial connector module of a receptacle for transporting liquefied gas and a liquefied gas transport system including the same that enables easy connection of a transferring pipe, wherein a twin-axial vacuum-insulated pipe is formed, to a hydrogen liquefier or a storage tank so as to supply liquefied hydrogen generated in the hydrogen liquefier to the storage tank and retrieve vaporized gas generated in the storage tank to the hydrogen liquefier for re-liquefaction.

2. Description of the Related Art

Conventionally, fossil fuels such as oil, coal, and natural gas have been primarily used as energy sources. However, these resources have disadvantages of being finite and emitting carbon compounds that cause global warming. Accordingly, technologies are being developed that use hydrogen as an energy source that can be used to produce electricity in an eco-friendly and efficient manner, has no risk of depletion, is sustainable, and has advantages of being easy to store and transport.

In general, hydrogen has a disadvantage of being difficult to store or transport due to its large volume as it exists in gaseous state at room temperature. Accordingly, a method of using liquefied hydrogen by liquefying hydrogen at −253 degrees Celsius is mainly used, and such liquefied hydrogen must be continuously maintained at a cryogenic temperature of −253 degrees Celsius during transportation and storage processes.

However, in order to store liquefied hydrogen, a storage tank with a large amount of liquefied hydrogen must be sufficiently cooled, and a large amount of vaporized gas generated at this time is flowed into the atmosphere through a vent, leading to frequent occurrence of hydrogen loss.

In case of retrieving and re-liquefying vaporized gas with a hydrogen liquefier to prevent such hydrogen loss, significant heat loss occurs due to circulation gas pipes exposed to room temperature, leading to a decrease in re-liquefaction efficiency. Furthermore, conventionally there has been a lot of inconvenience in connecting various lines, such as a liquefied hydrogen supply line or a vaporized gas return line, leading to decreased charging efficiency and a sharp decrease in re-liquefaction efficiency due to pressure drops.

SUMMARY

The present disclosure is intended to solve various problems including the above problems, and has a purpose to provide a two-way twin-axial connector module of a receptacle for transporting liquefied gas and a liquefied gas transfer system including the same capable of improving economical efficiency of re-liquefaction by enabling easy connection of a transferring pipe (flexible vacuum-insulated pipe), in which a supply line for supplying liquefied hydrogen and a return line for retrieving vaporized gas are twin-axially formed in a vacuum-insulated interior, to a hydrogen liquefier or a storage tank, thereby implementing a re-liquefaction flow of vaporized gas generated in a storage tank and minimizing heat loss during a re-liquefaction flow process. However, these problems are exemplary, but a scope of the present disclosure is not limited thereto.

According to an aspect of the present disclosure, a two-way twin-axial connector module of a receptacle for transporting liquefied gas is provided. The two-way twin-axial connector module may comprise: a male connector connected to an end of a transferring pipe incorporating a first supply line for supplying liquefied gas and a first return line for retrieving vaporized gas, including a pair of male bayonets formed to protrude and surround protruding portions of the first supply line and the first return line, respectively, which are formed to protrude outward through the end of the transferring pipe; and a female connector incorporating a second supply line for supplying liquefied gas and a second return line for retrieving vaporized gas, to be connected to a supply source for supplying liquefied gas or a storage tank for storing liquefied gas, and including a pair of female bayonets concavely formed and connecting with the second supply line and the second return line, respectively, wherein the female connector may be equipped with a cylinder valve unit installed at the end of the pair of female bayonets so that the cylinder valve unit can elastically move forward and backward by contact with the pair of male bayonets, and may selectively connect the first supply line and the first return line on the pair of male bayonets and the second supply line and the second return line on the pair of female bayonets according to the forward and backward movement of the cylinder valve unit.

According to an embodiment of the present disclosure, the male connector may include a male connector body having one end portion formed in a closed hollow pipe shape, connected to the end portion of the transferring pipe, accommodating at least a portion of the first supply line and the first return line therein; and a pair of male bayonets formed to surround protruding portions of the first supply line and the first return line, respectively, which are formed to protrude outward through one end of the male connector body.

According to an embodiment of the present disclosure, the female connector may include a connecting housing formed to protrude from an outer side surface of the supply source or the storage tank in a circular ring shape to surround at least a portion of the male connector body; a pair of female bayonets formed inside the connecting housing at a position corresponding to the pair of male bayonets, being concavely formed in a shape corresponding to a shape of the pair of male bayonets so that the pair of male bayonets can be inserted thereinto; and a cylinder valve unit installed at the end of the pair of female bayonets so as to be incorporated inside the supply source or the storage tank, elastically moving forward and backward by contact with the pair of male bayonets which are inserted into the pair of female bayonets, and selectively connecting the first supply line and the first return line on the pair of male bayonets and the second supply line and the second return line on the pair of female bayonets.

According to an embodiment of the present disclosure, the connecting housing may include a first sealing member formed in an O-ring shape along an inner diameter surface so as to prevent leakage of liquefied gas or vaporized gas.

According to an embodiment of the present disclosure, the male connector body may include a locking device including a hook that is installed on an outer diameter surface to be biaxially rotatable; and the connecting housing may include a protruded portion formed to protrude in a radial direction of the connecting housing at a position corresponding to the locking device on an outer diameter surface so that the hook of the locking device can be hooked.

According to an embodiment of the present disclosure, the male connector body may include a pair of male bosses formed to protrude in a boss shape to surround at least a portion of the pair of male bayonets; and the connecting housing may include a pair of female bosses formed to protrude from an entrance portion of the pair of female bayonets in a boss shape having a diameter larger than the pair of male bosses so as to accommodate the pair of male bosses.

According to an embodiment of the present disclosure, the pair of female bosses may include a second sealing member formed in an O-ring shape along an inner diameter surface so as to prevent leakage of liquefied gas or vaporized gas.

According to an embodiment of the present disclosure, the male connector body may have vacuum atmosphere formed therein so as to insulate the first supply line and the first return line accommodated therein from external environment.

According to an embodiment of the present disclosure, the pair of female bayonets and the cylinder valve unit may be installed to be vacuum-insulated inside the supply source or the storage tank so that they can be insulated from external environment.

According to an embodiment of the present disclosure, the cylinder valve unit may include a valve body installed inside the supply source or the storage tank and forming: a connecting chamber in which liquefied gas or vaporized gas can selectively flow; and a connecting channel formed to have a smaller cross-sectional area than the connecting chamber to connect the connecting chamber and the second supply line or the second return line; a movable valve body having one end formed in an opened hollow pipe shape, including at least one connecting hole capable of penetrating an outer side surface to be connected with an internal space so as to move forward and backward in the connecting chamber of the valve body; a fixed valve body installed on one side of the connecting chamber, including: a first accommodating groove for accommodating at least a portion of the pair of male bayonets on one side; a second accommodating groove for accommodating at least a portion of the movable valve body on the other side opposite thereto; and a penetrating hole for connecting between the first accommodating groove formed on one side and the second accommodating groove formed on the other side; an elastic member installed on the other side of the connecting chamber to elastically press forward the movable valve body in a direction toward the first accommodating groove; and a nipple installed at an entrance portion of the connecting channel to accommodate and support at least a portion of the elastic member.

According to an embodiment of the present disclosure, the movable valve body may include a movable portion formed in a circular pipe shape having a predetermined diameter so as to be accommodated in the second accommodating groove of the fixed valve body; and a contacting portion formed in a circular pipe shape having a diameter smaller than the movable portion so as to protrude to the first accommodating groove through the penetrating hole of the fixed valve body when the movable portion moves forward in a direction toward the first accommodating groove within the second accommodating groove by pressure of the elastic member so that the contacting portion can be in contact with the pair of male bayonets accommodated in the first accommodating groove.

According to an embodiment of the present disclosure, the connecting hole may be formed to penetrate an outer side surface of the movable portion, and may be formed at a position that may be closed by an inner side surface of the second accommodating groove when the movable portion moves forward in a direction to the first accommodating groove within the second accommodating groove by pressure of the elastic member.

According to an embodiment of the present disclosure, the movable valve body may further include a flange formed to protrude in a circular ring shape along the outer side surface of the movable portion; and a third sealing member formed in an O-ring shape along one side surface of the flange so as to prevent leakage of liquefied gas or vaporized gas.

According to an embodiment of the present disclosure, the flange may have one side surface, on which the third sealing member is seated, being formed as an inclined surface inclined toward a backward movement direction of the movable valve body as it moves away from a central axis of the movable valve body based on a radial direction of the movable valve body; and the fixed valve body may have one side surface, in contact with the third sealing member, being formed as an inclined surface inclined in a direction opposite to the inclined surface of the flange.

According to an embodiment of the present disclosure, the flange may have an opposite side surface, on which the elastic member is seated, being formed as a plane parallel to a radial direction of the movable valve body so as to support the elastic member.

According to an embodiment of the present disclosure, the nipple may be formed in a hollow pipe shape with both sides opened so as to accommodate and support at least a portion of the elastic member and connect between the connecting chamber and the connecting channel, and may have hollows formed in multiple stages so that a supporting portion for supporting the elastic member can be formed on an inside of the nipple.

According to an embodiment of the present disclosure, the nipple may have at least one connecting hole capable of being connected with an internal space of the hollows by penetrating an outer side surface of the nipple.

According to an embodiment of the present disclosure, the connecting housing may have an outer side surface, through which inert gas is sprayed through an external spray nozzle when connecting the male connector and the female connector, so as to prevent moisture in atmosphere from icing on the outer side surface due to conductive cooling of liquefied gas flowing inside.

According to the other aspect of the present disclosure, a two-way twin-axial connector module of a receptacle for transporting liquefied gas is provided. The two-way twin-axial connector module may comprise: a male connector connected to an end portion of a transferring pipe incorporating a first supply line for supplying liquefied hydrogen and a first return line for retrieving vaporized gas, including a pair of male bayonets formed to protrude and surround protruding portions of the first supply line and the first return line, respectively, which are formed to protrude outward through the end portion of the transferring pipe; a female connector incorporating a second supply line for supplying the liquefied hydrogen and a second return line for retrieving vaporized gas, to be connected to a supply source for supplying the liquefied hydrogen or a storage tank for storing the liquefied hydrogen, including a pair of female bayonets concavely formed and connecting with the second supply line and the second return line, respectively; wherein the male connector may include: a male connector body having one end portion formed in a closed hollow pipe shape, connected to the end portion of the transferring pipe, accommodating at least a portion of the first supply line and the first return line therein; and a pair of male bayonets formed to surround protruding portions of the first supply line and the first return line, respectively, which are formed to protrude outward through one end of the male connector body; the female connector may include a connecting housing formed to protrude from an outer side surface of the supply source or the storage tank in a circular ring shape to surround at least a portion of the male connector body; a pair of female bayonets formed inside the connecting housing at a position corresponding to the pair of male bayonets, being concavely formed in a shape corresponding to a shape of the pair of male bayonets so that the pair of male bayonets can be inserted thereinto; and a cylinder valve unit installed at an end portion of the pair of female bayonets so as to be incorporated inside the supply source or the storage tank, elastically moving forward and backward by contact with the pair of male bayonets which are inserted into the pair of female bayonets, and selectively connecting the first supply line and the first return line on the pair of male bayonets and the second supply line and the second return line on the pair of female bayonets; the male connector body may include a pair of male bosses formed to protrude in a boss shape to surround at least a portion of the pair of male bayonets; the connecting housing may include a pair of female bosses formed to protrude from an entrance portion of the pair of female bayonets in a boss shape having a diameter larger than the pair of male bosses so as to accommodate the pair of male bosses; and the cylinder valve unit may include: a valve body installed inside the supply source or the storage tank, forming a connecting chamber in which liquefied gas or vaporized gas can selectively flow, and a connecting channel formed to have a smaller cross-sectional area than the connecting chamber to connect the connecting chamber and the second supply line or the second return line; a movable valve body having one end formed in an opened hollow pipe shape, including at least one connecting hole capable of penetrating an outer side surface to be connected with an internal space so as to move forward and backward in the connecting chamber of the valve body; a fixed valve body installed on one side of the connecting chamber, including: a first accommodating groove for accommodating at least a portion of the pair of male bayonets on one side; a second accommodating groove for accommodating at least a portion of the movable valve body on the other side opposite thereto; and a penetrating hole for connecting between the first accommodating groove formed on one side and the second accommodating groove formed on the other side; an elastic member installed on the other side of the connecting chamber to elastically press forward the movable valve body in a direction toward the first accommodating groove; and a nipple installed at an entrance portion of the connecting channel to accommodate and support at least a portion of the elastic member.

According to another aspect of the present disclosure, a liquefied gas transport system is provided. The liquefied gas transport system may comprise: a hydrogen liquefier for cooling hydrogen to liquefaction temperature or less to produce liquefied hydrogen; a storage tank for storing the liquefied hydrogen; a transferring pipe incorporating a pair of a supply line and a return line to connect the hydrogen liquefier and the storage tank, wherein the supply line supplies liquefied hydrogen from the hydrogen liquefier to the storage tank and the return line retrieves vaporized gas from the storage tank to the hydrogen liquefier so that vaporized gas generated in the storage tank can be re-liquefied in the hydrogen liquefier; and a two-way twin-axial connector module installed at a connecting portion between the hydrogen liquefier and the transferring pipe and a connecting portion between the storage tank and the transferring pipe so that the hydrogen liquefier and the transferring pipe and the storage tank and the transferring pipe can be connected; wherein the two-way twin-axial connector module may include: a male connector connected to an end portion of the transferring pipe incorporating a first supply line for supplying liquefied gas and a first return line for retrieving vaporized gas, including a pair of male bayonets formed to protrude and surround protruding portions of the first supply line and the first return line, respectively, which are formed to protrude outward through the end portion of the transferring pipe; and a female connector incorporating a second supply line for supplying liquefied gas and a second return line for retrieving vaporized gas, to be connected to the hydrogen liquefier or the storage tank, including a pair of female bayonets concavely formed and connecting with the second supply line and the second return line, respectively; and the female connector may be equipped with a cylinder valve unit installed at an end portion of the pair of female bayonets so that the cylinder valve unit can elastically move forward and backward by contact with the pair of male bayonets, so as to selectively connect the first supply line and the first return line on the pair of male bayonets and the second supply line and the second return line on the pair of female bayonets according to the forward and backward movement of the cylinder valve unit.

According to an embodiment of the present disclosure configured as described above, it is possible to enable easy connection of a transferring pipe (flexible vacuum-insulated pipe), in which a supply line for supplying liquefied hydrogen and a return line for retrieving vaporized gas are twin-axially formed in a vacuum-insulated interior, to a hydrogen liquefier or a storage tank which are supply sources for supplying liquefied hydrogen, by using a male connector including a pair of male bayonets and a female connector including a pair of female bayonets into which the pair of male bayonets can be inserted.

Furthermore, the pair of male bayonets of the male connector are inserted into the pair of female bayonets of the female connector, and at the same time, a cylinder valve unit on the female connector is operated to be opened, allowing liquid hydrogen to be easily supplied to the storage tank without separate operation of a valve, or allowing vaporized gas generated in the storage tank to be retrieved.

Furthermore, vacuum insulation is applied to the male connector and the female connector to insulate each of the bayonets and lines from external environment, and double sealing members are applied to connecting portions of the connectors to prevent leakage of liquefied hydrogen or vaporized gas.

Furthermore, nitrogen gas having relatively high temperature is injected to the connecting portions of the connectors by using a separate spray nozzle, thereby preventing a phenomenon that moisture in atmosphere is iced on inner and outer surfaces of the connectors due to conductive cooling of cryogenic hydrogen flowing along the line inside, and preventing the connectors from becoming impossible or difficult to be separated due to generation of ice at the connecting portions of the connectors.

In this way, it is possible to implement a two-way twin-axial connector module of a receptacle for transporting liquefied gas and a liquefied gas transfer system including the same capable of improving charging efficiency of liquefied hydrogen and economical efficiency of re-liquefaction of vaporized gas by enabling easy connection of a transferring pipe, in which a supply line and a return line are twin-axially formed, to a hydrogen liquefier or a storage tank, thereby implementing a re-liquefaction flow of vaporized gas generated in a storage tank and minimizing heat loss during a supply process for liquefied hydrogen and a re-liquefaction and retrieval flow process of vaporized gas. However, the scope of the present disclosure is not limited by these effects.

DETAILED DESCRIPTION

Figure 1:
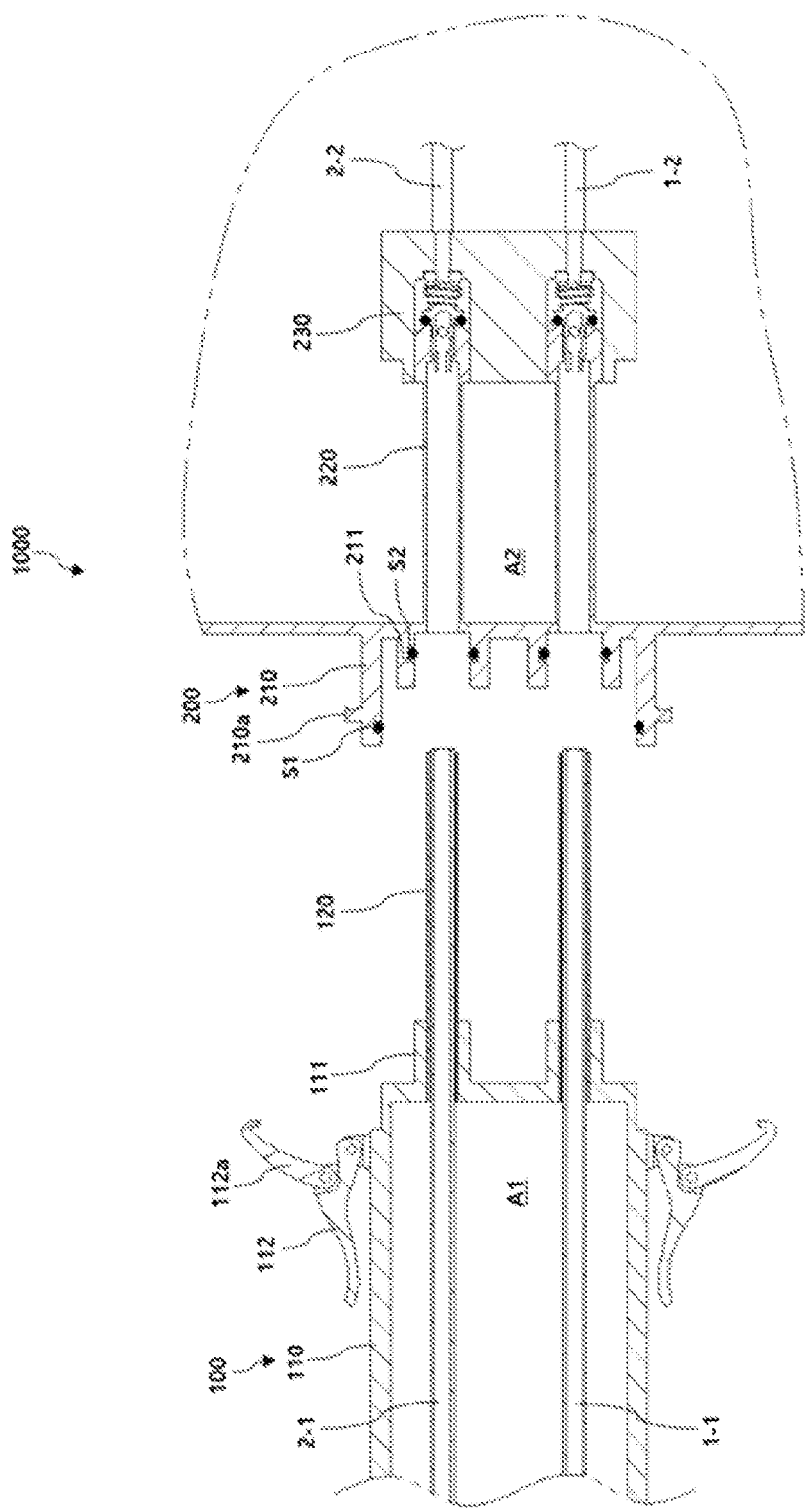
FIG. 1 is a cross-sectional view schematically showing a two-way twin-axial connector module of a receptacle for transporting liquefied gas according to an embodiment of the present disclosure.

Hereinafter, various preferred embodiments of the present disclosure will be described in detail with reference to the appended drawings.

The embodiments of the present disclosure are provided to more completely explain the present disclosure to those skilled in the art, and the following embodiments can be modified into various other forms, and the scope of the present disclosure is not limited to the following embodiments. Rather, these embodiments are provided to make the present disclosure more faithful and complete and to fully convey the spirit of the present disclosure to those skilled in the art. Furthermore, the thickness and size of each layer in the drawings are exaggerated for convenience and clarity of explanation.

Hereinafter, embodiments of the present disclosure will now be described with reference to drawings that schematically show ideal embodiments of the present disclosure. In the drawings, variations of the depicted shape may be expected, for example, depending on manufacturing technology and/or tolerances. Accordingly, embodiments of the present disclosure should not be construed as being limited to the specific shape of the area shown in this specification, but should include, for example, changes in shape resulting from manufacturing.

Figure 2:
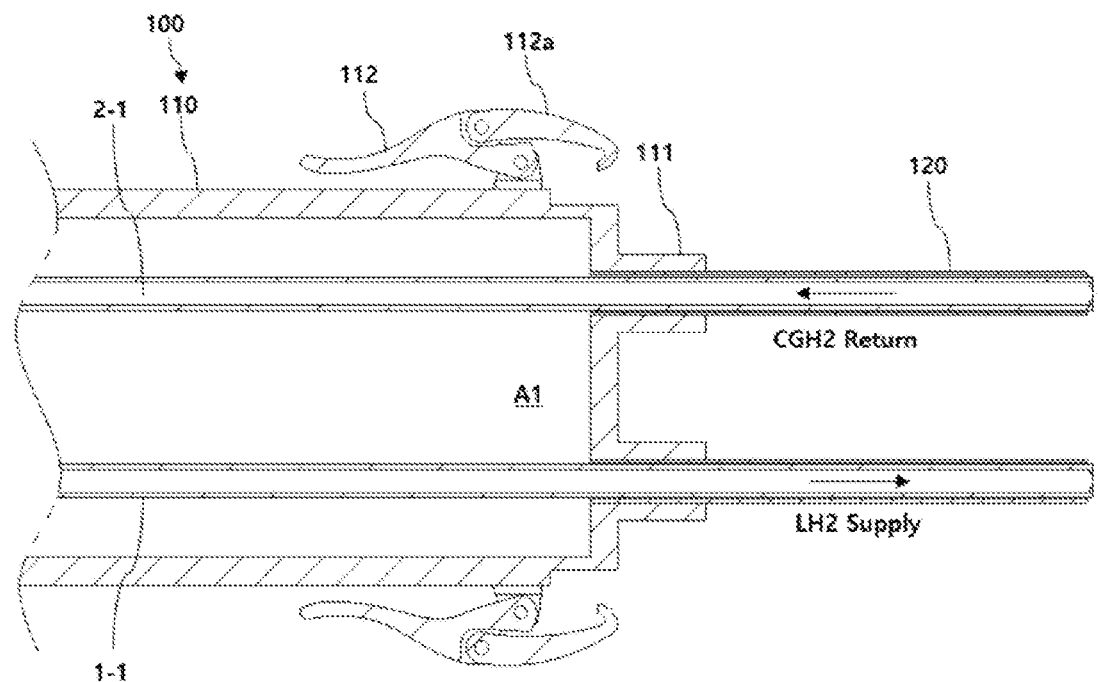
FIG. 2 and FIG. 3 are cross-sectional views showing a male connector and a female connector of the two-way twin-axial connector module of the receptacle for transporting liquefied gas of FIG. 1, respectively.
Figure 3:
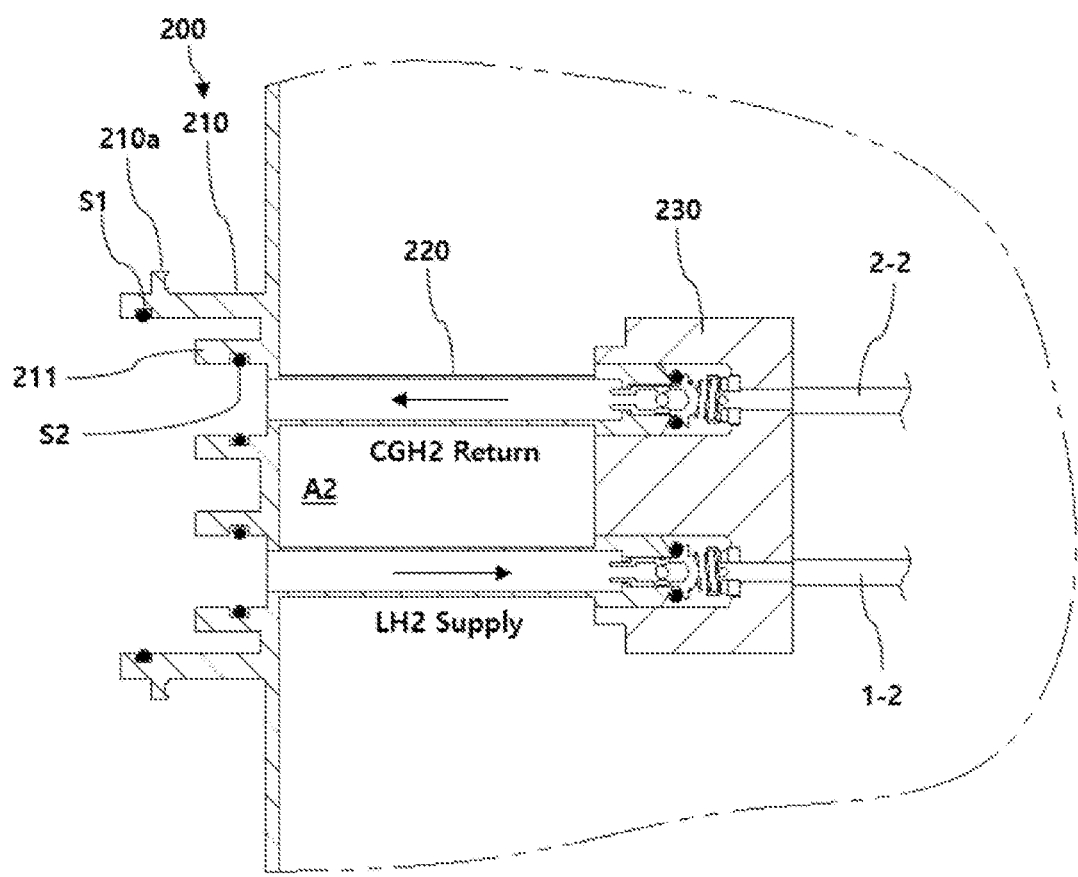
Figure 4:
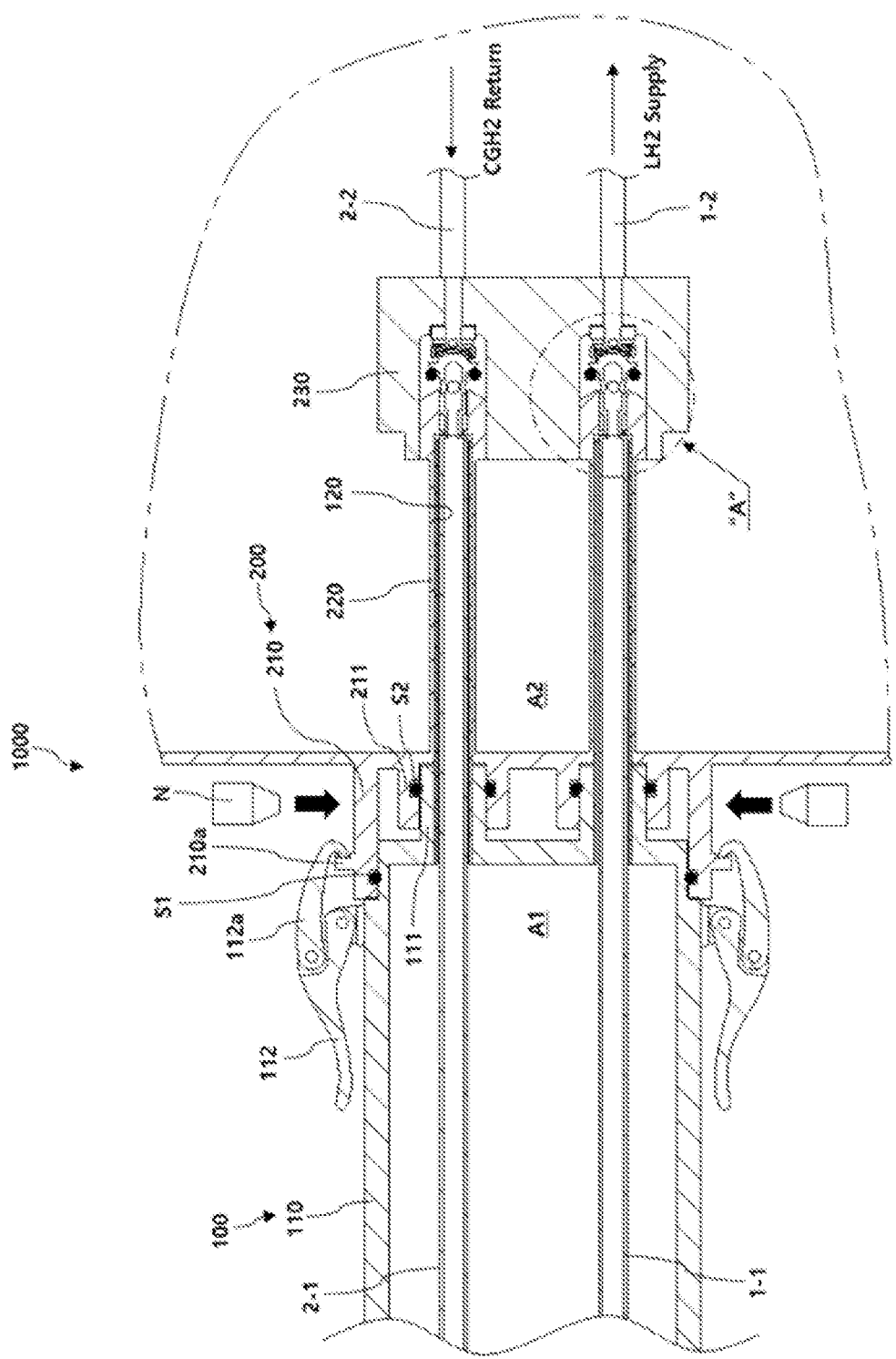
FIG. 4 is a cross-sectional view schematically showing a connected shape of the two-way twin-axial connector module of the receptacle for transporting liquefied gas of FIG. 1.
Figure 5:
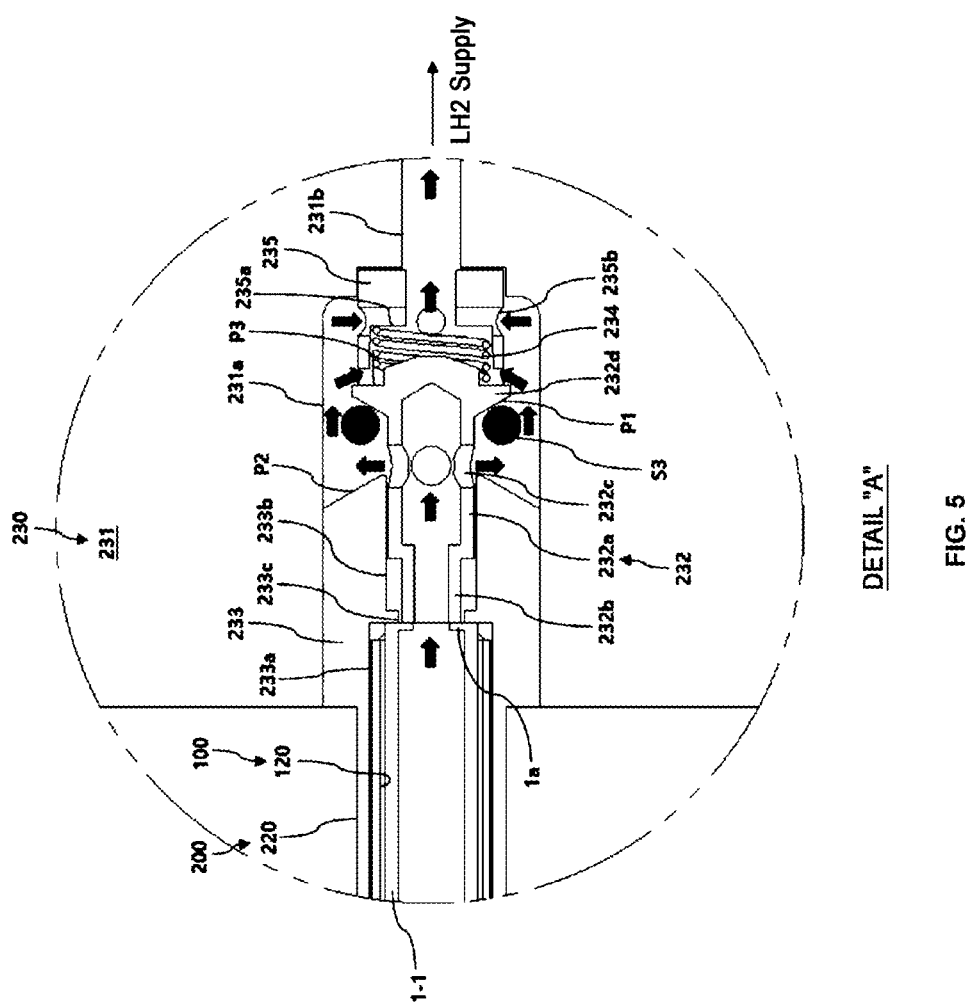
FIG. 5 is a cross-sectional view schematically showing an enlarged view of an "A" portion of FIG. 4.
Figure 6:
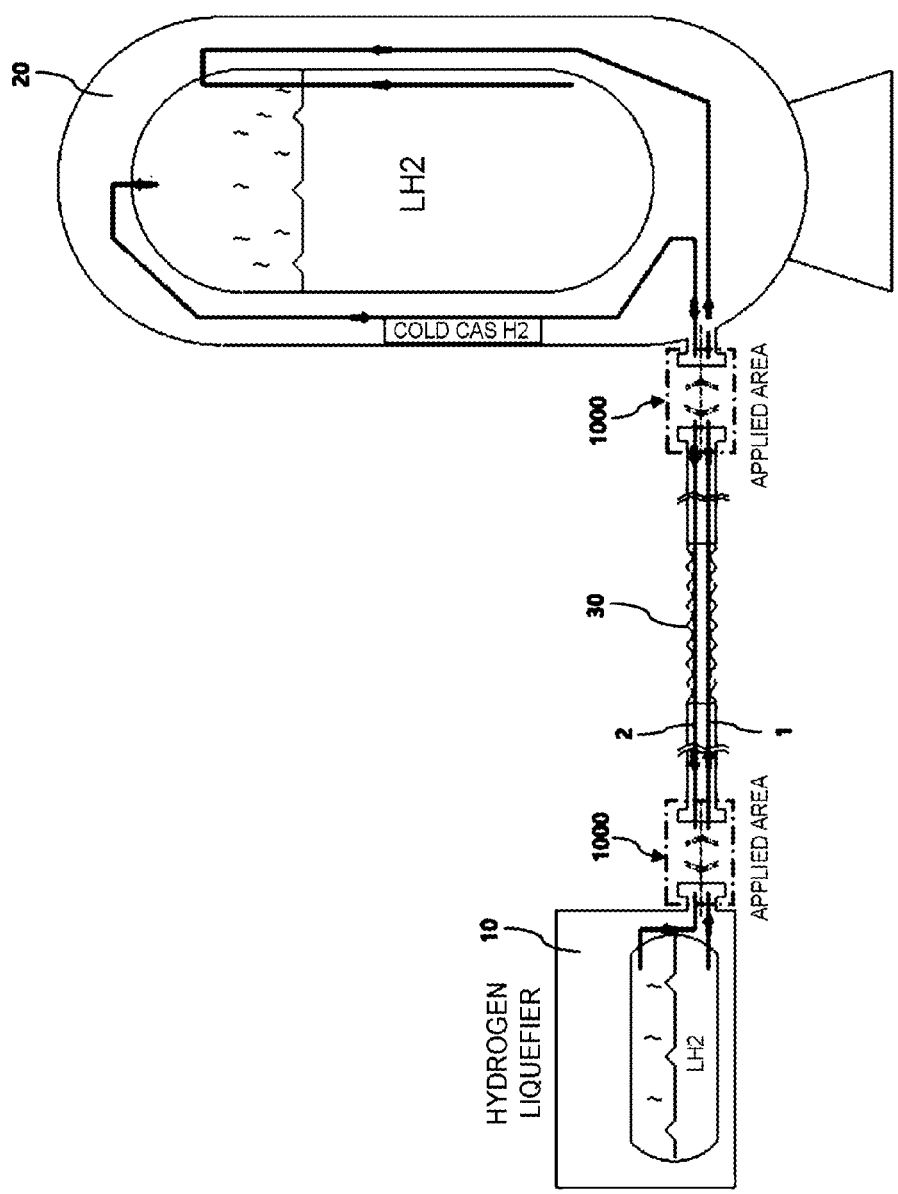
FIG. 6 and FIG. 7 are cross-sectional views showing embodiments of liquefied gas transport systems to which the two-way twin-axial connector module of the receptacle for transporting liquefied gas of FIG. 1 can be applied.
Figure 7:
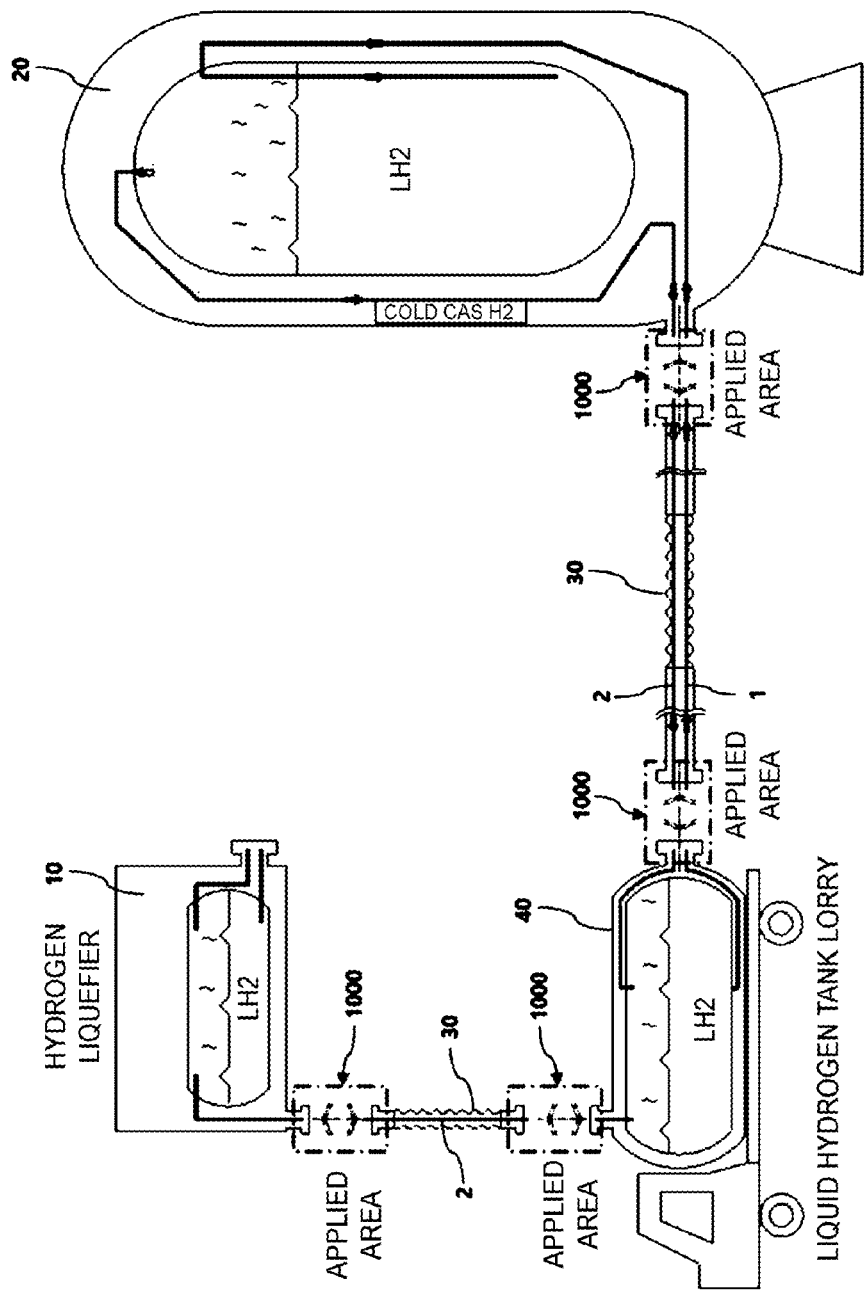

FIG. 1 is a cross-sectional view schematically showing a two-way twin-axial connector module of a receptacle for transporting liquefied gas 1000 according to an embodiment of the present disclosure; FIG. 2 and FIG. 3 are cross-sectional views separately showing a male connector 100 and a female connector 200 of the two-way twin-axial connector module 1000 of FIG. 1, respectively; and FIG. 4 is a cross-sectional view schematically showing a connected shape of the two-way twin-axial connector module 1000. Furthermore, FIG. 5 is a cross-sectional view schematically showing an enlarged view of an "A" portion of FIG. 4; and FIG. 6 and FIG. 7 are cross-sectional views showing embodiments of liquefied gas transport systems to which the two-way twin-axial connector module 1000 of FIG. 1 can be applied.

As shown in FIG. 1, the two-way twin-axial connector module 1000 according to an embodiment of the present disclosure may primarily comprise a male connector 100 and a female connector 200.

As shown in FIG. 1 and FIG. 2, the male connector 100 may be connected to an end portion of a transferring pipe (See 30 of FIG. 6), which twin-axially incorporates a first supply line 1-1 for supplying liquefied hydrogen liquefied in an external supply source such as a hydrogen liquefier (See 10 of FIG. 6) or a movable tank lorry (See 40 in FIG. 7) and a first return line 2-1 for retrieving vaporized gas generated in a cooling process and a storing process in a storage tank (See 20 of FIG. 6) to a supply source for re-liquefaction, and may include a pair of male bayonets formed to protrude and surround protruding portions of the first supply line 1-1 and the first return line 2-1, respectively, which are formed to protrude outward through the end portion of the transferring pipe 30.

For example, the male connector 100 may include: a male connector body 110 formed in a cylindrical pipe shape with one end having a closed hollow, which is connected to the end of the transferring pipe 30 and accommodating at least a portion of the first supply line 1-1 and the first return line 2-1 therein; and a pair of male bayonets 120 generally formed in a cylindrical pipe shape and formed to surround protruding portions of the first supply line 1-1 and the first return line 2-1, respectively, which are formed to protrude outside through one end of the male connector body 110.

More specifically, the male connector body 110 can, inside, form a vacuum atmosphere in an internal space A1 so as to insulate the first supply line 1-1 and the first return line 2-1 accommodated therein from external environment.

Furthermore, the male connector body 110 may include a pair of male bosses 111 formed to protrude in a boss shape to surround at least a portion of a connecting portion with the pair of male bayonets 120, thereby reinforcing strength of the connecting portion between the male connector body 110 and the pair of male bayonets 120. Moreover, although not shown, in order to further reinforce strength of the connecting portion between the male connector body 110 and the pair of male bayonets 120, it may also be possible for at least one or more reinforcing ribs to be formed along an outer diameter surface of the pair of male bosses 111.

As shown in FIG. 1 and FIG. 3, a female connector 200 may be formed to incorporate a second supply line 1-2 for supplying liquefied hydrogen and a second return line 2-2 for retrieving vaporized gas, to be connected to or incorporated into the supply source for supplying liquefied hydrogen or a storage tank 20 for storing liquefied hydrogen, and to have a pair of female bayonets 220 for connecting with the second supply line 1-2 and the second return line 2-2, respectively, being concavely formed in a shape corresponding to the male bayonets 120.

At this time, the female connector 200 may be equipped with a cylinder valve unit 230 installed at an inner end of the pair of female bayonets 220 so that the cylinder valve unit 230 can elastically move forward and backward by contact with the pair of male bayonets 120, and may selectively connect the first supply line 1-1 and the first return line 2-1 on the pair of male bayonets 120 and the second supply line 1-2 and the second return line 2-2 on the pair of female bayonets 220 according to forward and backward movement of the cylinder valve unit 230.

More specifically, the female connector 200 may include: a connecting housing 210 formed in a ring shape protruding from an outer side surface of the supply source or the storage tank 20 to surround at least a portion of the male connector body 110 to be connected thereto; and a pair of female bayonets 220 formed inside the connecting housing 210 at a position corresponding to the pair of male bayonets 120, allowing for insertion of a pair of male bayonets 120 formed into a shape corresponding to a shape of the pair of male bayonets 120, being concavely formed from the outer surface of the supply source or storage tank 20.

More specifically, the connecting housing 210 may include a pair of female bosses 211, which are formed in boss shapes with a larger diameter than the pair of male bosses 111 at an entrance portion of the pair of female bayonets 220, enabling them to accommodate the pair of male bosses 111.

Accordingly, as shown in FIG. 1 and FIG. 4, when the male connector 100 and the female connector 200 are connected, an end portion of the male connector body 110 is inserted into the connecting housing 210 and the pair of male bosses 111 formed to protrude from the end portion of the male connector body 110 may be inserted into the pair of female bosses 211.

In this connection process, the pair of male bayonets 120 of the male connector 100 are inserted into the pair of female bayonets 220 of the female connector 200, thereby connecting the first supply line 1-1 and the first return line 2-1 connected to the male connector 100 and the second supply line 1-2 and the second return line 2-2 connected to the female connector 200 each other through the connectors 100, 200.

At this time, the female connector 200 may include a first sealing member S1 formed in an O-ring shape along an inner diameter surface of the connecting housing 210, and a second sealing member S2 formed in an O-ring shape along an inner diameter surface of the pair of female bosses 211, thereby doubly preventing leakage of liquefied hydrogen or vaporized gas flowing through the bayonets 120, 220 by connection of the connectors 100, 200.

Furthermore, the female connector 200 may be installed in the inner space (A2) of the supply source or the storage tank 20 where a vacuum atmosphere is formed in such a way that the pair of female bayonets 220 and a cylinder valve unit 230, which is to be described later, can be vacuum-insulated from external environment, thereby vacuum-insulating the pair of female bayonets 220, into which the pair of male bayonets 120 are inserted, and the second supply line 1-2 and the second return line 2-2 connected thereto from external environment.

In this way, the connecting portions of the first supply line 1-1 and second supply line 1-2 and the first return line 2-1 and the second return line 2-2 connected through the bayonets 120, 220 by connection of the connectors 100, 200 are formed to be vacuum-insulated, thereby minimizing heat loss during a supply process of liquefied hydrogen and a retrieval process of vaporized gas, thus enhancing economic efficiency of re-liquefaction of vaporized gas.

Furthermore, within the connecting housing 210, inert gas such as nitrogen gas having relatively high temperature is sprayed to an outer side surface through an external spray nozzle N, thereby preventing moisture in atmosphere from icing on the outer side surface due to conductive cooling of liquefied hydrogen and vaporized gas flowing inside, thus preventing a problem in that the male connector 100 and the female connector 200 are not separated or become difficult to be separated due to freezing.

Furthermore, as shown in FIG. 1 to FIG. 4, the male connector body 110 may include a locking device 112 having a hook 112a that is installed on an outer diameter surface to be biaxially rotatable; and the connecting housing 210 may include a protruded portion 210a formed to protrude in a radial direction of the connecting housing 210 at a position corresponding to the locking device 112 on the outer diameter surface so that the hook 112a of the locking device 112 can be hooked, thereby fastening the connected male connector 100 and the female connector 200 in a lock clamp method.

However, the fastening method of the male connector 100 and the female connector 200 is not limited to the lock clamp method described above, but may include any locking method capable of firmly fastening the connected male connector 100 and the female connector 200 such as a quick connector method or a rotary lock method through thread fastening.

Furthermore, as shown in FIG. 1 to FIG. 4, the female connector 20 may include a cylinder valve unit 230 so that the pair of female bayonets 220 are selectively opened only when the male connector 100 and the female connector 200 are connected, thereby selectively connecting the first supply line 1-1 and the first return line 2-1 on the pair of male bayonets 120 and the second supply line 1-2 and the second return line 2-2 on the pair of female bayonets 220.

For example, the cylinder valve unit 230 may be installed at the end portion of the pair of female bayonets 220 so as to be incorporated inside the supply source or the storage tank 20, and elastically move forward and backward by contact with the pair of male bayonets 120 which are inserted into the pair of female bayonets 220, thereby selectively connecting the first supply line 1-1 and the first return line 2-1 on the pair of male bayonets 120 and the second supply line 1-2 and the second return line 2-2 on the pair of female bayonets 220, only when the male connector 100 and the female connector 200 are connected.

More specifically, as shown in FIG. 5, at a connection point where the first supply line 1-1 of the pair of male bayonets 120 and the second supply line 1-2 of the pair of female bayonets 220 connect when the connectors 100, 200 are connected, for example, the cylinder valve unit 230 may primarily include a valve body 231, a movable valve body 232, a fixed valve body 233, an elastic member 234, and a nipple 235.

As shown in FIG. 5, the valve body 231 is a type of block body, and may be installed inside the supply source or the storage tank 20 and may form a connecting chamber 231a in which liquefied hydrogen or vaporized gas can selectively flow and a connecting channel 231b formed to have a smaller cross-sectional area than the connecting chamber 231a so as to connect the connecting chamber 231a and the second supply line 1-2.

Furthermore, the movable valve body 232 may have one end formed in an opened hollow pipe shape, and may have at least one connecting hole 232c capable of penetrating an outer side surface to be connected with an internal space so as to move forward and backward in the connecting chamber 231a of the valve body 231, and the fixed valve body 233 may be installed on one side of the connecting chamber 231a, may have a first accommodating groove 233a for accommodating at least a portion of the pair of male bayonets 120 on one side and a second accommodating groove 233b for accommodating at least a portion of the movable valve body 232 on the other side, facing the first accommodating grave 233a, and may have a penetrating hole 233c for connecting between the first accommodating groove 233a formed on one side and the second accommodating groove 233b formed on an opposite side.

Furthermore, the elastic member 234 is a compressed coil spring and may be installed on an opposite side of the connecting chamber 231a to elastically press forward the movable valve body 232 in a direction toward the first accommodating groove 233a; and the nipple 235 may be installed at an entrance portion of the connecting channel 231b to accommodate and support at least a portion of the elastic member 234.

More specifically, the movable valve body 232 may include a movable portion 232a formed in a circular pipe shape having a predetermined diameter so as to be accommodated in the second accommodating groove 233b of the fixed valve body 233, and may have a contacting portion 232b formed in a circular pipe shape having a diameter smaller than the movable portion 232a so as to protrude to the first accommodating groove 233a through the penetrating hole 233c of the fixed valve body 233 when the movable portion 232a moves forward in a direction toward the first accommodating groove 233a within the second accommodating groove 233b by pressure of the elastic member 234 so that the contacting portion 232b can be in contact with the pair of male bayonets 120 accommodated in the first accommodating groove 233a.

At this time, the connecting hole 232c of the movable valve body 232 may be formed to penetrate an outer side surface of the movable portion 232a, and may be closed by an inner side surface of the second accommodating groove 233b when the movable portion 232a moves forward in a direction toward the first accommodating groove 233a within the second accommodating groove 233b by pressure of the elastic member 234, and may be formed in a position that can be opened by being positioned in the connecting chamber 231a when the movable portion 232a moves backward in a direction away from the first accommodating groove 233a within the second accommodating groove 233b by contact with the pair of male bayonets 120 or contact with an end portion of the first supply line 1-1 inserted into the pair of male bayonets 120.

Furthermore, the nipple 235 may be formed in a hollow pipe shape with opened both sides so as to accommodate and support at least a portion of the elastic member 234 and connect between the connecting chamber 231a and the connecting channel 231b, may have hollows formed in multiple stages so that a supporting portion 235a for supporting the elastic member 234 can be formed inside, and may have at least one connecting hole 235b capable of being connected with an internal space of the hollows by penetrating an outer side surface.

Therefore, as shown in FIG. 5, if the movable valve body 232 moves backward by contact with an end portion 1a of the first supply line 1-1 inserted into the pair of male bayonets 120 when the male connector 100 and the female connector 200 are connected, the connecting hole 232c of the movable valve body 232 is opened by being positioned in the connecting chamber 231a, such that the cylinder valve unit 230 can be in an opened state.

Accordingly, liquefied hydrogen supplied through the first supply line 1-1 enters inside of the hollow movable valve body 232, and then flows into the connecting chamber 231a through the connecting hole 232c, re-enters inside of the hollow nipple 235 through a space between the movable valve body 232, which is opened by the connecting hole 235b of the nipple 235 and the elastic member 234, and an end portion of the nipple 235, thereby flowing toward the second supply line 1-2 through the connecting channel 231b.

On the other hand, a connecting portion of the first return line 2-1 of the pair of male bayonets 120 and the second return line 2-2 of the pair of female bayonets 220, which is connected when the male connector 100 and the female connector 200 are connected, may have the same opened structure of the cylinder valve unit 230 as in FIG. 5, and vaporized gas may generate a flow in an opposite direction to aforementioned liquefied hydrogen.

For example, vaporized gas retrieved through the second return line 2-2 enters inside of the hollow nipple 235, and then flows into the connecting chamber 231a through a space between the movable valve body 232, which is opened by the connecting hole 235b of the nipple 235 and the elastic member 234, and an end portion of the nipple 235, re-entering inside of the hollow movable valve body 232 through the connecting hole 232c of the movable valve body 232, thereby flowing toward the first return line 2-1.

Furthermore, as shown in FIG. 5, the movable valve body 232 may further include a flange 232d formed to protrude in a circular ring shape along an outer side surface of the movable portion 232a and a third sealing member S3 formed in an O-ring shape along one side surface of the flange 232d to prevent leakage of liquefied gas or vaporized gas.

Accordingly, in a state where the male connector 100 and the female connector 200 are not connected, when the movable portion 232a moves forward in a direction toward the first accommodating groove 233a within the second accommodating groove 233b, the third sealing member S3 is pressed between one side surface of the flange 232d of the movable valve body 232 and one side surface of the fixed valve body 233 such that the cylinder valve unit 230 in a closed state can be sealed.

At this time, the flange 232d may have one side surface, on which the third sealing member S3 is seated, being formed as an inclined surface P1 inclined toward a backward movement direction of the movable valve body 232 as it moves away from a central axis of the movable valve body 232 based on a radial direction of the movable valve body 232, and when the cylinder valve unit 230 is closed, the fixed valve body 233 may have one side surface, in contact with the third sealing member S3, being formed as an inclined surface P2 inclined in a direction opposite to the inclined surface P1 of the flange 232d, thereby having an effect of further increasing sealing force by the third sealing member S3 pressed between one side surface of the flange 232d of the movable valve body 232 and one side surface of the fixed valve body 233.

Furthermore, it may be preferable that an opposite side surface, on which the elastic member 234 of the flange 232d is seated, is formed as a plane P3 parallel to a radial direction of the movable valve body 232 so as to support the elastic member 234.

The two-way twin-axial connector module 1000 according to aforementioned various embodiments of the present disclosure may be installed, as shown in FIG. 6, in a connecting portion of the hydrogen liquefier 10 and a transferring pipe 30 and a connecting portion of the storage tank 20 and the transferring pipe 30 so that a transferring pipe 30 incorporating a pair of a supply line 1 and a return line 2 is connected to the hydrogen liquefier 10 and the storage tank 20, respectively, wherein the supply line 1 supplies liquefied hydrogen from the hydrogen liquefier 10 that cools hydrogen to liquefaction temperature or less to produce liquefied hydrogen, to the storage tank 20, and the return line 2 retrieves vaporized gas from the storage tank 20 to the hydrogen liquefier 10 so that vaporized gas generated in the storage tank 20 can be re-liquefied in the hydrogen liquefier 10.

Accordingly, liquefied hydrogen generated in the hydrogen liquefier 10 flows along the supply line 1 of the transferring pipe 30, which is connected through a two-way twin-axial connector module 1000, to be supplied to the storage tank 20, and vaporized gas generated by vaporization of liquefied hydrogen in the storage tank 20 flows again along the return line 2 of the transferring pipe 30, which is connected through a two-way twin-axial connector module 1000, to be retrieved to the hydrogen liquefier 10, thereby implementing a liquefied hydrogen transport system for re-liquefying vaporized gas to liquefied hydrogen.

In addition to this, as shown in FIG. 7, the two-way twin-axial connector module 1000 according to aforementioned various embodiments of the present disclosure may be installed in a connecting portion of a tank lorry 40 and the transferring pipe 30 and a connecting portion of the storage tank 20 and the transferring pipe 30.

Accordingly, liquefied hydrogen transported to the tank lorry 40 flows along the supply line 1 of the transferring pipe 30, which is connected through a two-way twin-axial connector module 1000, to be supplied to the storage tank 20, and vaporized gas generated by vaporization of liquefied hydrogen in the storage tank 20 flows again along the return line 2 of the transferring pipe 30, which is connected through a two-way twin-axial connector module 1000, and can be retrieved to the tank lorry 40.

Here, another transferring pipe 30 of the tank lorry 40 may be connected to the hydrogen liquefier 10 through a two-way twin-axial connector module 1000 so that vaporized gas retrieved from the storage tank 20 and vaporized gas generated in the tank lorry 40 can be retrieved to the hydrogen liquefier 10, thereby implementing a liquefied hydrogen transport system for re-liquefying vaporized gas to liquefied hydrogen. In this embodiment, only the return line 2 is shown as being formed in the transferring pipe 30 connecting the tank lorry 40 and the hydrogen liquefier 10, but the present disclosure is not limited thereto. It is also possible for a supply line 1 to be twin-axially formed with the return line 2 in the transferring pipe 30 connecting the tank lorry 40 and the hydrogen liquefier 10, thereby re-supplying liquefied hydrogen, which had been re-liquefied in the hydrogen liquefier 10, to the tank lorry 40.

According to the two-way twin-axial connector module 1000 and a liquefied gas transport system including the same according to various embodiments of the present disclosure, it is possible to enable easy connection of a transferring pipe 30 (flexible vacuum-insulated pipe), in which a supply line 1 for supplying liquefied hydrogen and a return line 2 for retrieving vaporized gas are twin-axially formed in a vacuum-insulated interior, to a hydrogen liquefier 10, a tank lorry 40, or a storage tank 20 which are supply sources for supplying liquefied hydrogen, by using a male connector 100 including a pair of male bayonets 120 and a female connector 200 including a pair of female bayonets 220 into which the pair of male bayonets 120 can be inserted.

Furthermore, the pair of male bayonets 120 of the male connector 100 are inserted into the pair of female bayonets 220 of the female connector 200, and at the same time, a cylinder valve unit 230 on the female connector 200 is operated to be opened, allowing liquid hydrogen to be easily supplied to the storage tank 20 without separate operation of a valve, or allowing vaporized gas generated in the storage tank 20 to be retrieved.

Furthermore, vacuum insulation is applied to the male connector 100 and the female connector 200 to insulate each of the bayonets 120, 220 and lines 1, 2 from external environment, and double sealing members S1, S2 are applied to connecting portions of the connectors 100, 200 to prevent leakage of liquefied hydrogen or vaporized gas.

Furthermore, nitrogen gas having relatively high temperature is injected into the connecting portions of the connectors 100, 200 by using a separate spray nozzle N, thereby preventing a phenomenon that moisture in atmosphere is iced on inner and outer surfaces of the connectors 100, 200 due to conductive cooling of cryogenic hydrogen flowing along the line inside, thereby preventing the connectors from becoming impossible or difficult to be separated due to generation of ice at the connecting portions of the connectors.

Accordingly, the present disclosure may have an effect of improving charging efficiency of liquefied hydrogen and economical efficiency of re-liquefaction of vaporized gas by enabling easy connection of a transferring pipe 30, in which a supply line 1 and a return line 2 are twin-axially formed, to a hydrogen liquefier 10, or a supply source or a storage tank 20 such as a tank lorry 40, thereby implementing a re-liquefaction flow of vaporized gas generated in a storage tank 20 and minimizing heat loss during a supply process of liquefied hydrogen and a re-liquefaction and retrieval flow process of vaporized gas.

Furthermore, a liquefied hydrogen transport system was exemplified in the above-mentioned embodiments, but the present disclosure is not limited thereto, and it can be applied to any type of liquefied gas transport system capable of liquefaction.

Although the above has shown and described various embodiments of the present disclosure, the present disclosure is not limited to the specific embodiments described above. The above-described embodiments can be variously modified and implemented by those skilled in the art to which the present invention pertains without departing from the gist of the present disclosure claimed in the appended claims, and these modified embodiments should not be understood separately from the technical spirit or scope of the present disclosure. Therefore, the technical scope of the present disclosure should be defined only by the appended claims.

In the embodiments disclosed herein, arrangement of illustrated components may vary depending on requirements or environment in which the invention is implemented. For example, some components may be omitted or some components may be integrated and implemented as one.

What is claimed is:

1. A two-way twin-axial connector module of a receptacle for transporting liquefied gas, comprising:
   a male connector connected to an end portion of a transferring pipe incorporating a first supply line for supplying liquefied gas and a first return line for retrieving the vaporized gas, including a pair of male bayonets formed to protrude and surround protruding portions of the first supply line and the first return line, respectively, which are formed to protrude outward through the end portion of the transferring pipe; and a female connector incorporating a second supply line for supplying liquefied gas and a second return line for retrieving the vaporized gas, to be connected to a supply source for supplying liquefied gas or a storage tank for storing liquefied gas, including a pair of female bayonets concavely formed and connecting with the second supply line and the second return line, respectively, wherein the female connector is equipped with a cylinder valve unit installed at an end portion of the pair of female bayonets so that the cylinder valve unit can elastically move forward and backward by contact with the pair of male bayonets, and selectively connects the first supply line and the first return line on the pair of male bayonets and the second supply line and the second return line on the pair of female bayonets according to forward and backward movement of the cylinder valve unit.

2. The two-way twin-axial connector module according to claim 1, wherein the male connector includes:

a male connector body having one end portion formed in a closed hollow pipe shape, connected to the end portion of the transferring pipe, accommodating at least a portion of the first supply line and the first return line therein; and the pair of male bayonets formed to surround the protruding portions of the first supply line and the first return line, respectively, which are formed to protrude outward through one end of the male connector body.

3. The two-way twin-axial connector module according to claim 2, wherein the female connector includes:

a connecting housing formed to protrude from an outer side surface of the supply source or the storage tank in a circular ring shape to surround at least a portion of the male connector body;

the pair of female bayonets formed inside the connecting housing at a position corresponding to the pair of male bayonets, being concavely formed in a shape corresponding to a shape of the pair of male bayonets so that the pair of male bayonets can be inserted thereinto; and the cylinder valve unit installed at the end of the pair of female bayonets so as to be incorporated inside the supply source or the storage tank, elastically moving forward and backward by contact with the pair of male bayonets which are inserted into the pair of female bayonets, and selectively connecting the first supply line and the first return line on the pair of male bayonets and the second supply line and the second return line on the pair of female bayonets.

4. The two-way twin-axial connector module according to claim 3, wherein the connecting housing includes:

a first sealing member formed in an O-ring shape along an inner diameter surface so as to prevent leakage of the liquefied gas or the vaporized gas.

5. The two-way twin-axial connector module according to claim 3, wherein the male connector body includes a locking device including a hook that is installed on an outer diameter surface to be biaxially rotatable;

and the connecting housing includes a protruded portion formed to protrude in a radial direction of the connecting housing at a position corresponding to the locking device on an outer diameter surface so that the hook of the locking device can be hooked.

6. The two-way twin-axial connector module according to claim 3, wherein the male connector body includes a pair of male bosses formed to protrude in a boss shape to surround at least a portion of the pair of male bayonets; and the connecting housing includes a pair of female bosses formed to protrude from an entrance portion of the pair of female bayonets in a boss shape having a diameter larger than the pair of male bosses so as to accommodate the pair of male bosses.

7. The two-way twin-axial connector module according to claim 6, wherein the pair of female bosses include a second sealing member formed in an O-ring shape along an inner diameter surface so as to prevent leakage of the liquefied gas or the vaporized gas.

8. The two-way twin-axial connector module according to claim 2, wherein the male connector body has a vacuum atmosphere formed therein so as to insulate the first supply line and the first return line accommodated therein from an external environment.

9. The two-way twin-axial connector module according to claim 3, wherein the pair of female bayonets and the cylinder valve unit are installed to be vacuum-insulated inside the supply source or the storage tank so that they can be insulated from an external environment.

10. The two-way twin-axial connector module according to claim 3, wherein the cylinder valve unit includes:

a valve body installed inside the supply source or the storage tank and forming: a connecting chamber in which the liquefied gas or the vaporized gas can selectively flow; and a connecting channel formed to have a smaller cross-sectional area than the connecting chamber to connect the connecting chamber and the second supply line or the second return line;

a movable valve body having one end formed in an opened hollow pipe shape, including at least one connecting hole capable of penetrating an outer side surface to be connected with an internal space so as to move forward and backward in the connecting chamber of the valve body;

a fixed valve body installed on one side of the connecting chamber, including: a first accommodating groove for accommodating at least a portion of the pair of male bayonets on one side; a second accommodating groove for accommodating at least a portion of the movable valve body on the other side opposite thereto; and a penetrating hole for connecting between the first accommodating groove formed on one side and the second accommodating groove formed on the other side;

an elastic member installed on the other side of the connecting chamber to elastically press forward the movable valve body in a direction toward the first accommodating groove; and a nipple installed at an entrance portion of the connecting channel to accommodate and support at least a portion of the elastic member.

11. The two-way twin-axial connector module according to claim 10,
wherein the movable valve body includes:
a movable portion formed in a circular pipe shape having a predetermined diameter so as to be accommodated in the second accommodating groove of the fixed valve body; and
a contacting portion formed in a circular pipe shape having a diameter smaller than the movable portion so as to protrude to the first accommodating groove through the penetrating hole of the fixed valve body when the movable portion moves forward in a direction toward the first accommodating groove within the second accommodating groove by pressure of the elastic member so that the contacting portion can be in contact with the pair of male bayonets accommodated in the first accommodating groove.

12. The two-way twin-axial connector module according to claim 11,
wherein the connecting hole is formed to penetrate an outer side surface of the movable portion, and is formed at a position that may be closed by an inner side surface of the second accommodating groove when the movable portion moves forward in a direction to the first accommodating groove within the second accommodating groove by pressure of the elastic member.

13. The two-way twin-axial connector module according to claim 11,
wherein the movable valve body includes:
a flange formed to protrude in a circular ring shape along the outer side surface of the movable portion; and
a third sealing member formed in an O-ring shape along one side surface of the flange so as to prevent leakage of the liquefied gas or the vaporized gas.

14. The two-way twin-axial connector module according to claim 13,
wherein the flange has one side surface, on which the third sealing member is seated, being formed as an inclined surface inclined toward a backward movement direction of the movable valve body as it moves away from a central axis of the movable valve body based on a radial direction of the movable valve body; and
the fixed valve body has one side surface, in contact with the third sealing member, being formed as an inclined surface inclined in a direction opposite to the inclined surface of the flange.

15. The two-way twin-axial connector module according to claim 14,
wherein the flange has an opposite side surface, on which the elastic member is seated, being formed as a plane parallel to a radial direction of the movable valve body so as to support the elastic member.

16. The two-way twin-axial connector module according to claim 10,
wherein the nipple is formed in a hollow pipe shape with opened both sides so as to accommodate and support at least a portion of the elastic member and connect between the connecting chamber and the connecting channel, and has hollows formed in multiple stages so that a supporting portion for supporting the elastic member can be formed on an inside of the nipple.

17. The two-way twin-axial connector module according to claim 16,
wherein the nipple has at least one connecting hole capable of being connected with an internal space of the hollows by penetrating an outer side surface of the nipple.

18. The two-way twin-axial connector module according to claim 3,
wherein the connecting housing has an outer side surface, through which inert gas is sprayed through an external spray nozzle when connecting the male connector and the female connector, so as to prevent moisture in atmosphere from icing on the outer side surface due to conductive cooling of liquefied gas flowing inside.

19. A two-way twin-axial connector module of a receptacle for transporting liquefied gas, comprising:
a male connector connected to an end portion of a transferring pipe incorporating a first supply line for supplying the liquefied gas and a first return line for retrieving the vaporized gas, including a pair of male bayonets formed to protrude and surround protruding portions of the first supply line and the first return line, respectively, which are formed to protrude outward through the end portion of the transferring pipe; and
a female connector incorporating a second supply line for supplying the liquefied gas and a second return line for retrieving the vaporized gas, to be connected to a supply source for supplying the liquefied gas or a storage tank for storing the liquefied gas, including a pair of female bayonets concavely formed and connecting with the second supply line and the second return line, respectively,
wherein the male connector includes:
a male connector body having one end portion formed in a closed hollow pipe shape, connected to the end portion of the transferring pipe, accommodating at least a portion of the first supply line and the first return line therein; and
the pair of male bayonets formed to surround the protruding portions of the first supply line and the first return line, respectively, which are formed to protrude outward through one end of the male connector body;
the female connector includes:
a connecting housing formed to protrude from an outer side surface of the supply source or the storage tank in a circular ring shape to surround at least a portion of the male connector body;
a pair of female bayonets formed inside the connecting housing at a position corresponding to the pair of male bayonets, being concavely formed in a shape corresponding to a shape of the pair of male bayonets so that the pair of male bayonets can be inserted thereinto; and
a cylinder valve unit installed at an end portion of the pair of female bayonets so as to be incorporated inside the supply source or the storage tank, elastically moving forward and backward by contact with the pair of male bayonets which are inserted into the pair of female bayonets, and selectively connecting the first supply line and the first return line on the pair of male bayonets and the second supply line and the second return line on the pair of female bayonets;
the male connector body includes a pair of male bosses formed to protrude in a boss shape to surround at least a portion of the pair of male bayonets;
the connecting housing includes a pair of female bosses formed to protrude from an entrance portion of the pair of female bayonets in a boss shape having a diameter larger than the pair of male bosses so as to accommodate the pair of male bosses;
and the cylinder valve unit includes:
a valve body installed inside the supply source or the storage tank, forming a connecting chamber in which the liquefied gas or the vaporized gas can selectively flow and a connecting channel formed to have a smaller cross-sectional area than the connecting chamber to connect the connecting chamber and the second supply line or the second return line;
a movable valve body having one end formed in an opened hollow pipe shape, including at least one connecting hole capable of penetrating an outer side surface to be connected with an internal space so as to move forward and backward in the connecting chamber of the valve body;
a fixed valve body installed on one side of the connecting chamber, including: a first accommodating groove for accommodating at least a portion of the pair of male bayonets on one side; a second accommodating groove for accommodating at least a portion of the movable valve body on the other side opposite thereto; and a penetrating hole for connecting between the first accommodating groove formed on one side and the second accommodating groove formed on the other side;
an elastic member installed on the other side of the connecting chamber to elastically press forward the movable valve body in a direction toward the first accommodating groove; and
a nipple installed at an entrance portion of the connecting channel to accommodate and support at least a portion of the elastic member.

20. A liquefied gas transport system, comprising:
a hydrogen liquefier for cooling hydrogen to liquefaction temperature or less to produce liquefied hydrogen;
a storage tank for storing the liquefied hydrogen;
a transferring pipe incorporating a pair of a supply line and a return line to connect the hydrogen liquefier and the storage tank, the supply line supplying liquefied hydrogen from the hydrogen liquefier to the storage tank and the return line retrieving the vaporized gas from the storage tank to the hydrogen liquefier so that the vaporized gas generated in the storage tank can be re-liquefied in the hydrogen liquefier; and
a two-way twin-axial connector module installed at a connecting portion between the hydrogen liquefier and the transferring pipe and a connecting portion between the storage tank and the transferring pipe so that the hydrogen liquefier and the transferring pipe and the storage tank and the transferring pipe can be connected;
wherein the two-way twin-axial connector module includes:
a male connector connected to an end portion of the transferring pipe incorporating a first supply line for supplying liquefied gas and a first return line for retrieving the vaporized gas, including a pair of male bayonets formed to protrude and surround protruding portions of the first supply line and the first return line, respectively, which are formed to protrude outward through the end portion of the transferring pipe; and
a female connector incorporating a second supply line for supplying liquefied gas and a second return line for retrieving the vaporized gas, to be connected to the hydrogen liquefier or the storage tank, including a pair of female bayonets concavely formed and connecting with the second supply line and the second return line, respectively, and
wherein the female connector is equipped with a cylinder valve unit installed at an end portion of the pair of female bayonets so that the cylinder valve unit can elastically move forward and backward by contact with the pair of male bayonets, so as to selectively connect the first supply line and the first return line on the pair of male bayonets and the second supply line and the second return line on the pair of female bayonets according to the forward and backward movement of the cylinder valve unit.

* * * * *